US009459773B2

(12) United States Patent
Hyun et al.

(10) Patent No.: US 9,459,773 B2
(45) Date of Patent: Oct. 4, 2016

(54) ELECTRONIC APPARATUS, METHOD FOR AUTHORING MULTIMEDIA CONTENT AND COMPUTER READABLE RECORDING MEDIUM STORING A PROGRAM FOR PERFORMING THE METHOD

(71) Applicant: Samsung Electronics Co. Ltd., Suwon-si, Gyeonggi-do (KR)

(72) Inventors: Ju-ho Hyun, Suwon-si (KR); Kyung-min Kim, Seoul (KR); Mu-hong Byun, Goyang-si (KR); Sung-wook Byun, Suwon-si (KR); Chae-kyung Lee, Seoul (KR); Jung-ah Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 14/039,471

(22) Filed: Sep. 27, 2013

(65) Prior Publication Data

US 2014/0089796 A1    Mar. 27, 2014

(30) Foreign Application Priority Data

Sep. 27, 2012  (KR) ........................ 10-2012-0108279

(51) Int. Cl.
*G06F 3/0484*   (2013.01)
*G06F 15/02*   (2006.01)
(Continued)

(52) U.S. Cl.
CPC .......... *G06F 3/0484* (2013.01); *G11B 27/031* (2013.01); *G11B 27/34* (2013.01); *G06F 15/0216* (2013.01); *G06F 17/241* (2013.01); *G11B 27/022* (2013.01); *G11B 27/10* (2013.01)

(58) Field of Classification Search
CPC .............. G06F 17/241; G06F 3/0484; G06F 15/0216; G11B 27/10; G11B 27/022; G11B 27/031; G11B 27/34
USPC ......... 715/716, 723, 776, 864, 866; 345/901
See application file for complete search history.

(56) References Cited

U.S. PATENT DOCUMENTS 8,739,019 B1 * 5/2014 Nevins .......................... 715/203
2003/0018663 A1 * 1/2003 Cornette et al. ........... 707/500.1
(Continued)

FOREIGN PATENT DOCUMENTS

JP          2010-73205 A      4/2010
KR    10-2006-0088175 A      8/2006
(Continued)

OTHER PUBLICATIONS

Lee, Injae et al. 'Interactive E-book Contents Authoring System based on MPEG-4 LASeR' In: Advanced Communication Technology (ICACT), 2011 13TH International Conference. IEEE, 2011, pp. 565-568.
(Continued)

*Primary Examiner* — Ting Lee
(74) *Attorney, Agent, or Firm* — Jefferson IP Law, LLP

(57) ABSTRACT

An electronic apparatus, a method for authorizing multimedia content thereof, and a non-transitory computer-readable recording medium storing therein a program to execute the method are provided. The method for generating multimedia content of the electronic apparatus includes displaying a page screen of electronic book content comprising text and video, receiving a user command to generate a multimedia object in synchronization with the video, and displaying a multimedia object generating window which is movable and size-adjustable within the page screen, and generating the multimedia object in synchronization with the video in response to the user command through the multimedia object generating window and storing the multimedia object in synchronization with the video. As a result, the user is able to author electronic book content comprising interactive multimedia therein.

17 Claims, 13 Drawing Sheets

(51) Int. Cl.
*G06F 17/24* (2006.01)
*G11B 27/10* (2006.01)
*G11B 27/022* (2006.01)
*G11B 27/031* (2006.01)
*G11B 27/34* (2006.01)

(56) References Cited

U.S. PATENT DOCUMENTS

| | | | |
|---|---|---|---|
| 2005/0257152 A1* | 11/2005 | Shimizu et al. | 715/723 |
| 2010/0216108 A1* | 8/2010 | Cooperman et al. | 434/317 |
| 2011/0106970 A1* | 5/2011 | Song et al. | 709/236 |
| 2011/0227949 A1 | 9/2011 | Kung et al. | |
| 2012/0064947 A1* | 3/2012 | Yi et al. | 455/566 |
| 2012/0102529 A1 | 4/2012 | Adimatyam et al. | |
| 2012/0107790 A1 | 5/2012 | Lee et al. | |
| 2012/0163770 A1 | 6/2012 | Kaiser et al. | |
| 2012/0240085 A1* | 9/2012 | Sim et al. | 715/864 |

FOREIGN PATENT DOCUMENTS

| | | |
|---|---|---|
| KR | 10-2011-0070496 A | 6/2011 |
| KR | 10-2012-0045744 A | 5/2012 |

OTHER PUBLICATIONS

XP 055100671, "Interaction magic in every book."

* cited by examiner

FIG. 12

```
varVsync_Obj = {
    Vsync_Info = [
        {
            doc_src: 'xxx.xhtml',
            vsync_element :
            [
                {
                    ref_id: '001',
                    target_tag; 'P',
                    vsync_attrs:
                    [
                        {
                            video_id: 'v1' ,
                                video_play; 'play',
                                video_style; 'show' ,
                            video_volume : '0.5' ,
                                style: 'font-weight:bold;color:red;font-size:30pt;
                                    text-decoration:under line;' ,
                                sync_time; '5'
                        }
                    ]
                },
                ....
            ....
```

ELECTRONIC APPARATUS, METHOD FOR AUTHORING MULTIMEDIA CONTENT AND COMPUTER READABLE RECORDING MEDIUM STORING A PROGRAM FOR PERFORMING THE METHOD

CROSS-REFERENCE TO RELATED APPLICATION(S)

This application claims the benefit under 35 U.S.C. §119(a) of a Korean patent application filed on Sep. 27, 2012 in the Korean Intellectual Property Office and assigned Serial No. 10-2012-0108279, the entire disclosure of which is hereby incorporated by reference.

TECHNICAL FIELD

The present disclosure relates to an electronic apparatus and a method for authoring multimedia content thereof, and a non-transitory computer-readable recording medium storing therein a program to perform the method. More particularly, the present disclosure relates to an electronic apparatus configured to author multimedia content playable on an e-book, and a method for authoring multimedia content thereof, and a non-transitory computer-readable recording medium recording therein a program to perform the method.

BACKGROUND

Related-art electronic (e)-book contents are based on electronic publication (epub)-based specifications, which mainly focus on digitization of paper content. As the epub 3 specification adopts HyperText Markup Language 5 (HTML5), multimedia elements, which are distinguished from the related-art paper books, can be introduced into the e-book contents.

However, even with the use of the epub 3 specification, the functions are still limited to providing simple multimedia content such as video content. That is, the new concept of multimedia elements that can change the paradigm of paper books have yet to be incorporated into e-book contents.

As the amount of e-book contents increases, particularly e-book contents for the education, there is an increasing need to author e-book contents that can provide not only unidirectional text and videos, but also interactive multimedia contents.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus configured to author multimedia content playable on an electronic (e)-book, and a method for authoring multimedia content thereof, and a non-transitory computer-readable recording medium recording therein a program to perform the method.

In accordance with an aspect of the present disclosure, a method for authoring multimedia contents of an electronic apparatus is provided. The method includes displaying a page screen of electronic book content comprising text and video, receiving a user command to generate a multimedia object in synchronization with the video, displaying a multimedia object generating window which is movable and size-adjustable within the page screen, and generating the multimedia object in synchronization with the video in response to the user command through the multimedia object generating window and storing the multimedia object in synchronization with the video.

The multimedia object generating window may include a first region to display a multimedia object as set by a user, and a second region to generate synchronization information between the multimedia object and the video.

The second region may include a time bar generated based on play time information of the video to time playing of the multimedia object when the video is played, and a play icon configured to set as to whether or not to play the video when the multimedia object is displayed.

The second region may additionally include a region to indicate a thumbnail of the multimedia object as set by the user.

The generating and storing may include moving the multimedia object generating window within the page screen in response to a user's drag input, and generating location information to display the multimedia object based on a location after movement in the page screen.

The generating and storing may include adjusting a size of the first region in response to a user input, and generating size information to display the multimedia object based on the adjusted size.

The multimedia object comprises at least one of a text, an image, a 3 Dimensional (3D) image, a widget, a quiz, and a video.

The multimedia object in synchronization with the video may include at least one of synchronization information, synchronization parser information, and synchronization processor information.

The synchronization information may be written in a JavaScript Object Notation (JSON) or Extensible Markup Language (XML) format.

In accordance with another aspect of the present disclosure, an electronic apparatus for executing electronic book content is provided. The electronic apparatus includes a display configured to display a page screen of the electronic book content comprising text and video, a user input configured to receive a user command, and a controller configured to control the display to display a multimedia object generating window which is movable and size-adjustable within the page screen, and to generate the multimedia object in synchronization with the video in response to the user command through the multimedia object generating window, in response to a user command inputted through the user input directing to generate the multimedia object in synchronization with the video.

The multimedia object generating window may include a first region to display a multimedia object as set by a user, and a second region to generate synchronization information between the multimedia object and the video.

The second region may include a time bar generated based on play time information of the video to time playing of the multimedia object when the video is played, and a play icon configured to set as to whether or not to play the video when the multimedia object is displayed.

The second region may additionally include a region to indicate a thumbnail of the multimedia object as set by the user.

The controller may control the display to move the multimedia object generating window within the page screen in response to a user's drag input, and to generate location information to display the multimedia object based on a location after movement in the page screen, in response to a user's drag input inputted to the user input directing to move the multimedia object generating window.

The controller may control the display to adjust a size of the first region in response to a user input and display, and to generate size information to display the multimedia object based on the adjusted size, in response to a user command inputted to the user input directing to adjust the size of the first region.

The multimedia object comprises at least one of a text, an image, a 3D image, a widget, a quiz, and a video.

The multimedia object in synchronization with the video may include at least one of synchronization information, synchronization parser information, and synchronization processor information.

The synchronization information may be written in a JSON or XML format.

In accordance with another aspect of the present disclosure, a non-transitory computer-readable recording medium recording therein a program to execute a method for authoring multimedia content is provided. The method for authoring multimedia content may include displaying a page screen of electronic book content comprising text and video, receiving a user command to generate a multimedia object in synchronization with the video, displaying a multimedia object generating window which is movable and size-adjustable within the page screen, and generating a multimedia object in synchronization with the video in response to the user command through the multimedia object generating window, and storing the multimedia object in synchronization with the video.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 illustrates synchronous information in Extensible Markup Language (JSON) format, according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
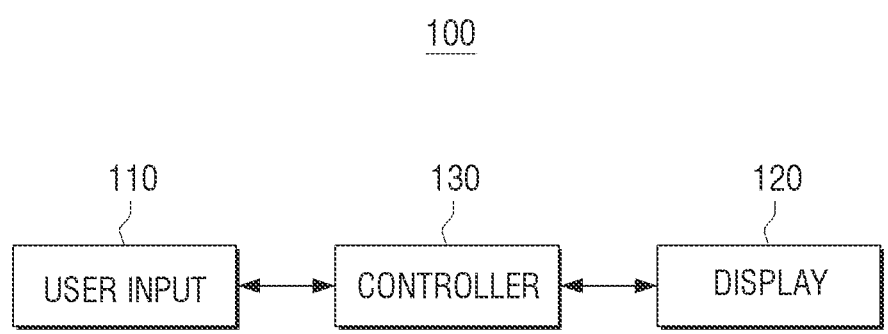
FIG. 1 is a schematic block diagram of an electronic apparatus according to an embodiment of the present disclosure.

FIG. 1 is a schematic view of an electronic apparatus according to an embodiment of the present disclosure.

Referring to FIG. 1, the electronic apparatus 100 may comprise a user input 110, a display 120 and a controller 130. In one embodiment, the electronic apparatus 100 may be a desktop Personal Computer (PC), but is not limited thereto. Accordingly, the electronic apparatus 100 may be implemented as a tablet PC, notebook PC, smartphone, smart PC, Personal Digital Assistant (PDA), or various other electronic apparatuses.

The user input 110 receives a user command to control the operation of the electronic apparatus 100. The user input 110 particularly receives a command to generate a multimedia object generating window to generate a multimedia object in synchronization with the video included in electronic (e)-book contents. Further, the user input 110 may receive a user command related to various settings and functions of the multimedia objects, using a multimedia object generating window.

The display 120 may display image data according to a command from the controller 130. To be specific, the display 120 may display e-book content comprising therein video and text. Further, in response to a preset user command inputted through the user input 110, the display 120 may display the multimedia object generating window to generate multimedia objects. The multimedia object window is movable in the page screen and is adjustable in size.

The controller 130 controls the overall operation of the electronic apparatus 100 in response to a user command inputted through the user input 110. To be specific, in response to a preset user command inputted to the user input 110, the controller 130 may control the display 120 to display a multimedia object generating window to generate a multimedia object in synchronization with the video included in the e-book contents. The multimedia object may comprise at least one of text, image, 3 Dimensional (3D) image, widget, quiz, and video.

Meanwhile, the multimedia object generating window is a User Interface (UI) that generates a multimedia object in synchronization with the video included in the e-book contents, and may comprise a first region to display the multimedia object as set by the user, and a second region to generate synchronization information between the multimedia object and the video. The second region may particularly comprise a time bar created based on video play time information to time the duration of the multimedia object playing, and a play icon to set whether or not to play video when the multimedia object is displayed.

The controller 130 may generate multimedia object information in synchronization with the video, when the user command is inputted through the multimedia object generating window.

To be specific, when the time information of the multimedia object is set via the time bar of the multimedia object generating window, the controller 130 may generate synchronization information in accordance with the user command as inputted. Further, the controller 130 may generate location and size information of the multimedia object, based on the location and size of the multimedia object generating window as adjusted by the user. Additionally, the controller 130 may set the type of the multimedia object and whether or not to play the video when the multimedia object is played, using the multimedia object generating window. Methods for generating multimedia objects using the multimedia object generating window will be explained in detailed further below with reference to FIGS. 2 to 11.

The multimedia object information in synchronization with the video may particularly comprise at least one of synchronization information, synchronization parser information, and synchronization processor information. The 'synchronization information' as used herein refers to information about the multimedia object in synchronization with the video, the 'synchronization parser information' as used herein refers to information to parse the synchronization information on the side of viewer, and the 'synchronization processor information' as used herein is information to process the synchronization information as parsed by the synchronization parser information on the side of viewer. The synchronization information, the synchronization parser information and the synchronization processor information may be written in Extensible Markup Language (JSON) or Extensible Markup Language (XML) format.

The controller 130 stores the generated multimedia object information. To be specific, the controller 130 may store the multimedia object information on a separate file from the e-book content, and may store this in the e-book contents.

As explained above, after the multimedia object information in synchronization with the generated first video is generated, to execute e-book contents, the first video included in the e-book contents may be executed, according to which at least one multimedia object is played in synchronization with the first video. Accordingly, the electronic apparatus 100 may provide the user with the multimedia contents with higher interactivity.

The method for generating multimedia object information in synchronization with video will be explained below, with reference to FIGS. 2 to 11.

Figure 2:
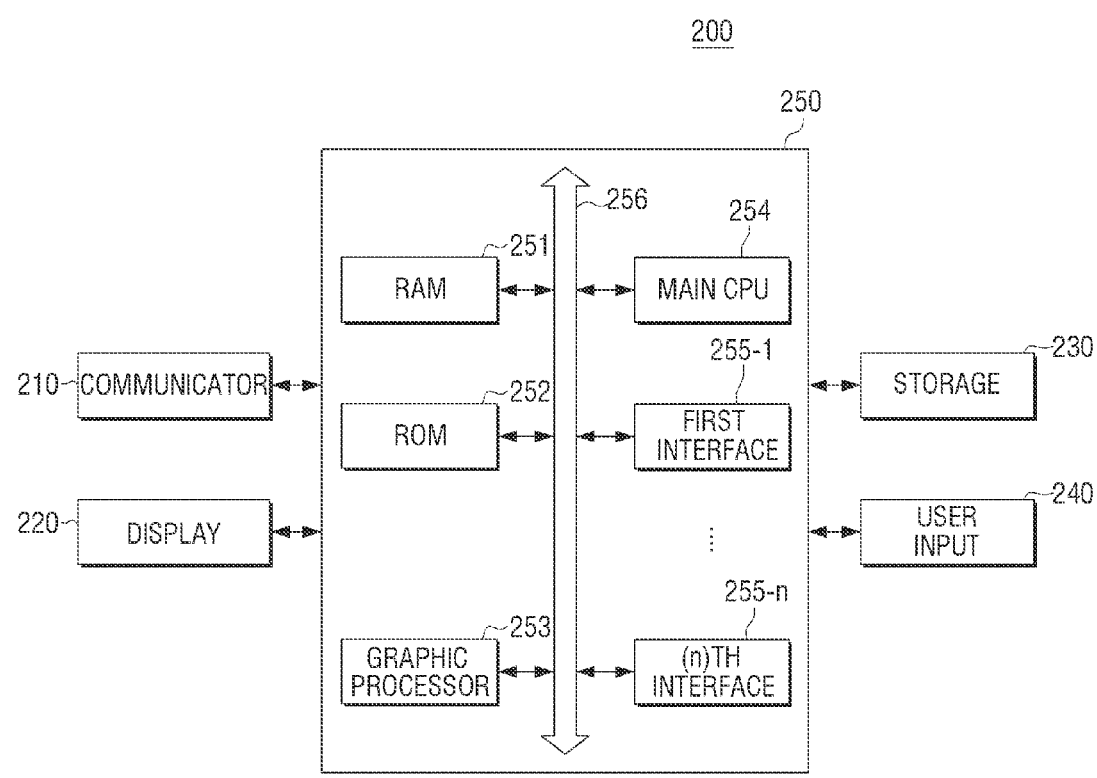
FIG. 2 is a detailed block diagram of an electronic apparatus according to an embodiment of the present disclosure.

FIG. 2 is a detailed block diagram of an electronic apparatus according to an embodiment of the present disclosure.

Referring to FIG. 2, the electronic apparatus 200 comprises a communicator 210, a display 220, a storage 230, a user input 240, and a controller 250.

The communicator 210 is configured to perform communication with various types of external devices or external servers according to various types of communication manners. To be specific, the communicator 210 may comprise a wired communication module comprising a Local Area Network (LAN) module, and wireless communication module such as a WiFi chip, a Bluetooth chip, or a Near Field Communication (NFC) chip. The WiFi chip, Bluetooth chip, or NFC chip perform communication in WiFi, Bluetooth or NFC manners. The NFC chip herein particularly refers to a chip that operates in an NFC manner using bandwidth of 135 kHz, among various Radio Frequency (RF)-IDentification (ID) frequency bands such as 13.56 MHz, 433 MHz, 860-960 MHz, 2.45 GHz. With the WiFi chip or Bluetooth chip, it is possible to first transmit and receive various connection information such as a Service Set ID (SSID) and a session key, to thus connect communication using the same for transmission and reception of various information. The wireless communication chip refers to a chip which performs communication according to various communication specifications such as Institute of Electrical and Electronics Engineers (IEEE), zigbee, 3rd Generation (3G), 3rd Generation Partnership Project (3GPP), or Long Term Evolution (LTE).

The display 220 displays image data generated under the control of the controller 250. The display 220 may particularly display e-book content comprising text and video. Further, the display 220 may display a multimedia object generating window to generate multimedia objects in synchronization with the video included in the e-book content.

The storage 230 stores various modules to drive the electronic apparatus 200. By way of example, the storage 230 may store software comprising a base module, a sensing module, a communication module, a presentation module, a web browser module, or a service module. The base module processes a signal transmitted from each hardware included in the electronic apparatus 200 and may transmit the same to the upper layer module. The sensing module collects information from various sensors and analyzes and manages the collected information, and may comprise a face recognition module, a voice recognition module, a motion recognition module, or an NFC recognition module. The presentation module constructs a display screen, and may comprise a multimedia module to play multimedia content and output the same, a UI, or a UI rendering module to perform graphic processing. The communication module performs communication with objects and/or entities external to the electronic apparatus 200. The web browser module performs web browsing when accessing a web server. The service module includes various applications to provide various services.

Further, the storage 230 stores therein various modules to execute e-book contents.

The user input 240 is configured to receive a user command to control the overall operation of the electronic apparatus 200. The input 280 may particularly receive a user command to generate a multimedia object generating window, and a user command regarding various settings of the multimedia objects using a multimedia object generating window.

Meanwhile, the user input 240 may be implemented as an input device such as a mouse, or keyboard, but is not limited thereto. Accordingly, the user input 240 may be implemented as various other input devices such as, for example, touch panel, pointing device, or motion sensing.

The controller 250 controls the overall operation of the electronic apparatus 200 using various programs stored in the storage 230.

Referring to FIG. 2, the controller 250 comprises a Random Access Memory (RAM) 251, a Read Only Memory (ROM) 252, a graphic processor 253, a main Central Processing Unit (CPU) 254, first to (n)th interfaces 255-1~255-n, or a bus 256. The RAM 251, the ROM 252, the graphic processor 253, the main CPU 254, and the first to (n)th interfaces 255-1~255-n may be connected to each other via the bus 256.

The ROM 252 stores therein a set of commands for the system booting. When electricity is supplied in response to a turn-on command, the main CPU 254 stores the Operating/System (O/S) stored in the storage 230 onto the RAM 251 in accordance with the command stored in the ROM 252, and boots the system by executing the O/S. Upon completion of the booting, the main CPU 254 copies various application programs stored in the storage 230 onto the RAM 251, and performs various operations by executing the application programs copied onto the RAM 251.

The graphic processor 253 generates a screen including various objects such as an icon, an image, a text using a calculator (not illustrated) and a renderer (not illustrated). The calculator calculates attribute values such as coordinates, configuration, size or color of each of the objects in accordance with the screen layout, using the control command received from the user input 240. The screen generated at the renderer is displayed within a display region of the display 220.

The main CPU 254 accesses the storage 230 and performs booting using the O/S stored in the storage 230. The main CPU 254 performs various operations using respective programs, contents, or data stored in the storage 230.

The first to (n)th interfaces 255-1~255-n are connected to the respective components explained above. One of the interfaces may be a network interface which is connected to an external device via network.

Meanwhile, the controller 250 may control the display 220 to display the e-book contents stored in the storage 230.

FIGS. 3, 4, 5, 6, 7, 8, 9, 10, and 11 are views provided to explain a method for authoring multimedia contents using a multimedia object generating window, according to various embodiments of the present disclosure.

Figure 3:
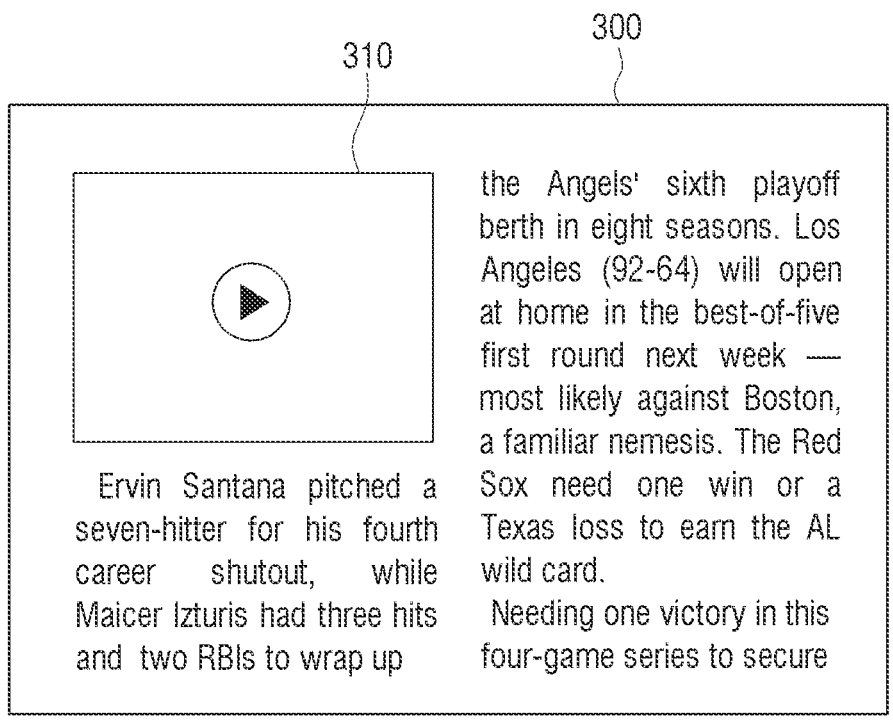
FIGS. 3, 4, 5, 6, 7, 8, 9, 10, and 11 are views provided to explain a method for authoring multimedia contents using a multimedia object generating window, according to various embodiments of the present disclosure.

Referring to FIG. 3, the controller 250 may display a page screen 300 which comprises text and video 310 among the e-book content. The page screen 300 may be provided to edit e-book content.

Figure 4:
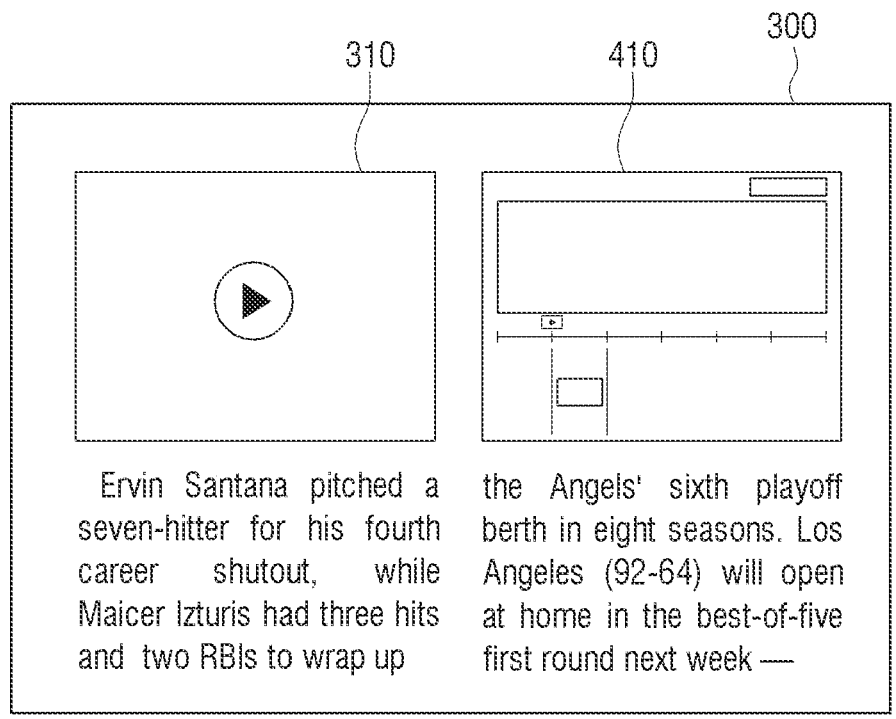

Referring to FIG. 4, in response to a user command inputted to the user input 240 directing to generate a multimedia object in synchronization with the video 310 included in the page screen 300 of the e-book content, the controller 250 may display the multimedia object generating window 410 in the page screen 300 of the e-book contents. The user command to generate the multimedia object may be inputted by selecting a corresponding menu on the menu provided on the upper end of the display screen to generate a multimedia object. To be specific, the multimedia object generating window 410 may not be overlapped on the video 310 when being displayed. The multimedia object generating window 410 may be moved within the page screen 300 in accordance with a user input and may also be adjustable in size.

The multimedia object generating window 410 will be explained in detail below with reference to FIG. 5. The multimedia object generating window 410 may comprise a first region to display a multimedia object as set by the user, and a second region to generate synchronization information between the multimedia object and the video.

Figure 5:
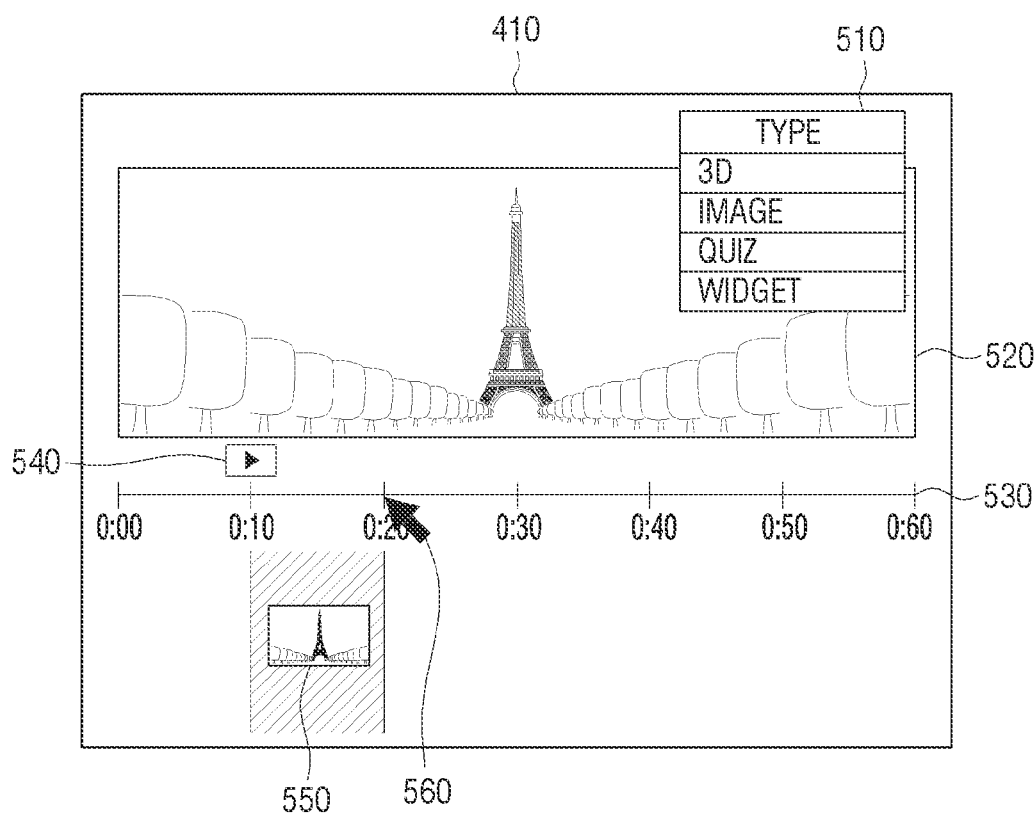
Figure 6:
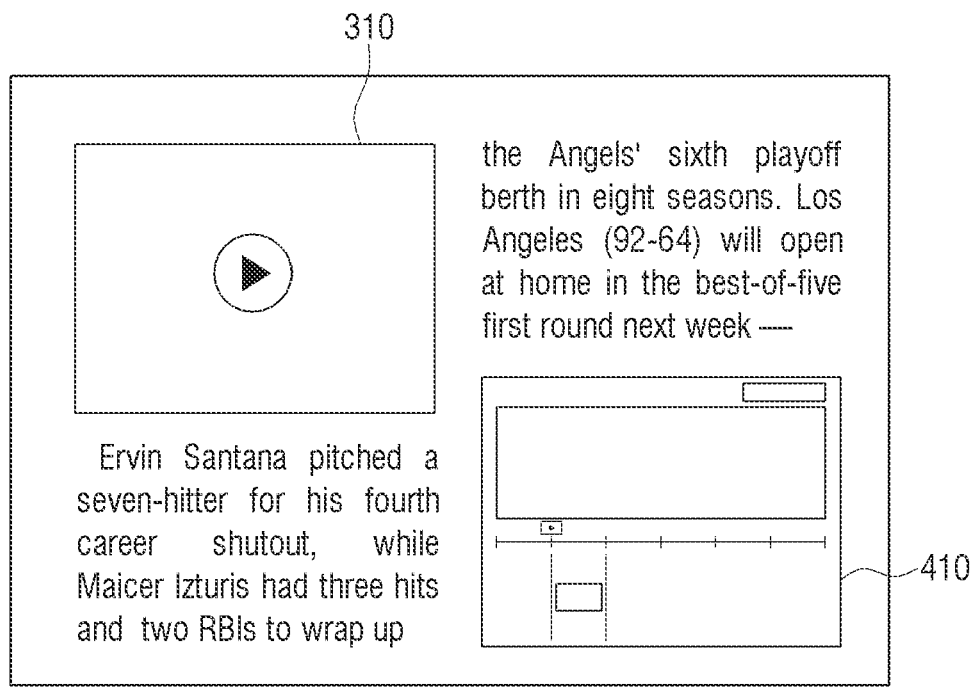
Figure 7:
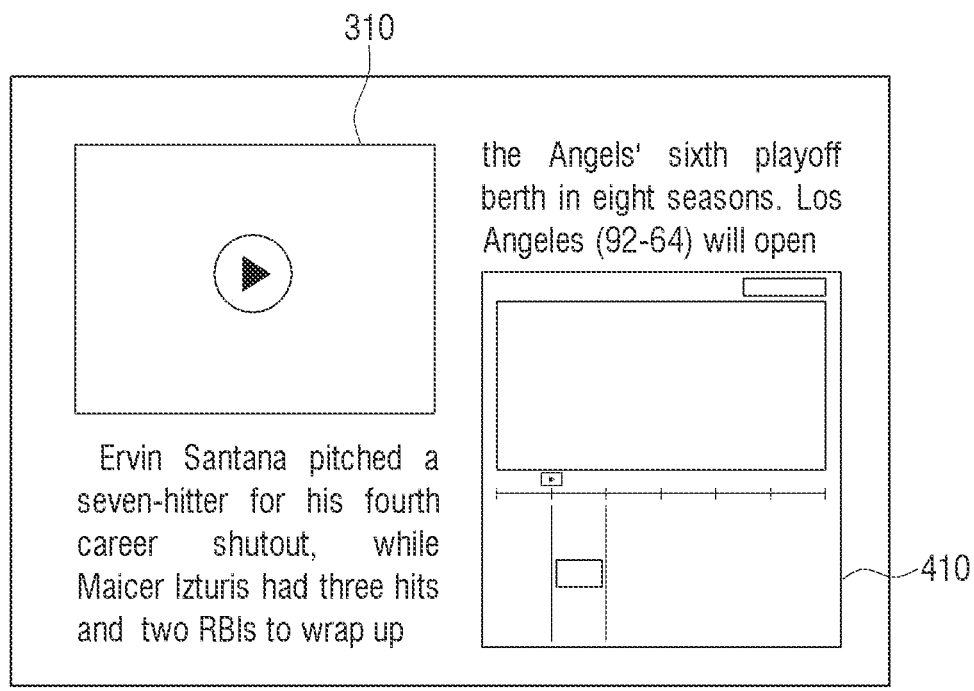

More specifically, referring to FIG. 5, the first region of the multimedia object generating window 410 may comprise a preview screen 520 through which a multimedia object is inputted or displayed. In a particular example where the text or quiz is incorporated into the multimedia object, a user may input intended text through the preview screen 520.

When the user intends to incorporate an image, a widget, an image gallery, or a video into the multimedia object, the preview image 520 may provide a preview image of the multimedia object for such input.

The second region of the multimedia object generating window 410 may comprise an object type menu 510 to set a type of the multimedia objects, a time bar 530 to time the play of the multimedia object when the video is played back, using the play time information of the video, a play icon 540 to set whether or not to play video when the multimedia object is displayed, and a thumbnail region 550 to display thumbnails of the multimedia objects as set by the user.

After the multimedia object generating window 410 is displayed, when a user inputs a command to set various settings for the multimedia object using the multimedia object generating window 410, the controller 250 may adjust the settings of the multimedia object according to the user command.

To be specific, when a user command directing to select one from among a plurality of types of multimedia objects is inputted through the object type menu 510 of the multimedia object generating window 410, the controller 250 generates type information of the multimedia object intended to be generated, based on the type as selected. For example, when the user selects 'image' from the object type menu 510, the controller 250 may generate "image" as the type information of the multimedia object.

Further, when a user command directing to change location and size of the multimedia object generating window 410 is inputted, the controller 250 generates location and size information of the multimedia based on the size and location of the multimedia object generating window as changed. For example, referring to FIG. 6, when a user command as inputted directs to move the multimedia object generating window 410 from the right side of the video to the lower, right side of the video, the controller 250 may store the information about the location at which the multimedia object generating window 410 is present as the location information of the multimedia object intended to be generated. Further, when a user command is inputted, directing to enlarge the multimedia object generating window 410 from the size illustrated in FIG. 5 to the size illustrated in FIG. 7, the controller 250 may store the enlarged size as the size information of the multimedia object intended to be generated. As explained above, by setting the size and location of the multimedia object directly through the multimedia object generating window 410, the user may generate multimedia objects more intuitively.

Further, when a user command is inputted using the time bar 530 of the multimedia object generating window 410, the controller 250 may generate play information of the multimedia object generating window 410 based on the time information as inputted through the time bar 530. The time information displayed on the time bar 530 may be generated by using the video play time. For example, the time information displayed on the time bar 530 may be 1 minute, when the video play time is 1 minute.

The method for setting time using the time bar 530 will be explained below with reference to FIGS. 8 and 9. More specifically, referring to FIG. 5, the play information of the first multimedia object set between 10 sec and 20 sec may be increased to between 10 sec and 30 sec using a pointer 560, in which case the controller 250 may set the play time of the first multimedia object to between 10 sec and 30 sec after video play. The interval between 10 and 30 sec, where the first multimedia object is played, may be displayed distinguishably from the rest area, and the thumbnail 550 of the first multimedia object may be displayed in the interval between 10 and 30 sec where the first multimedia object is played.

Figure 8:
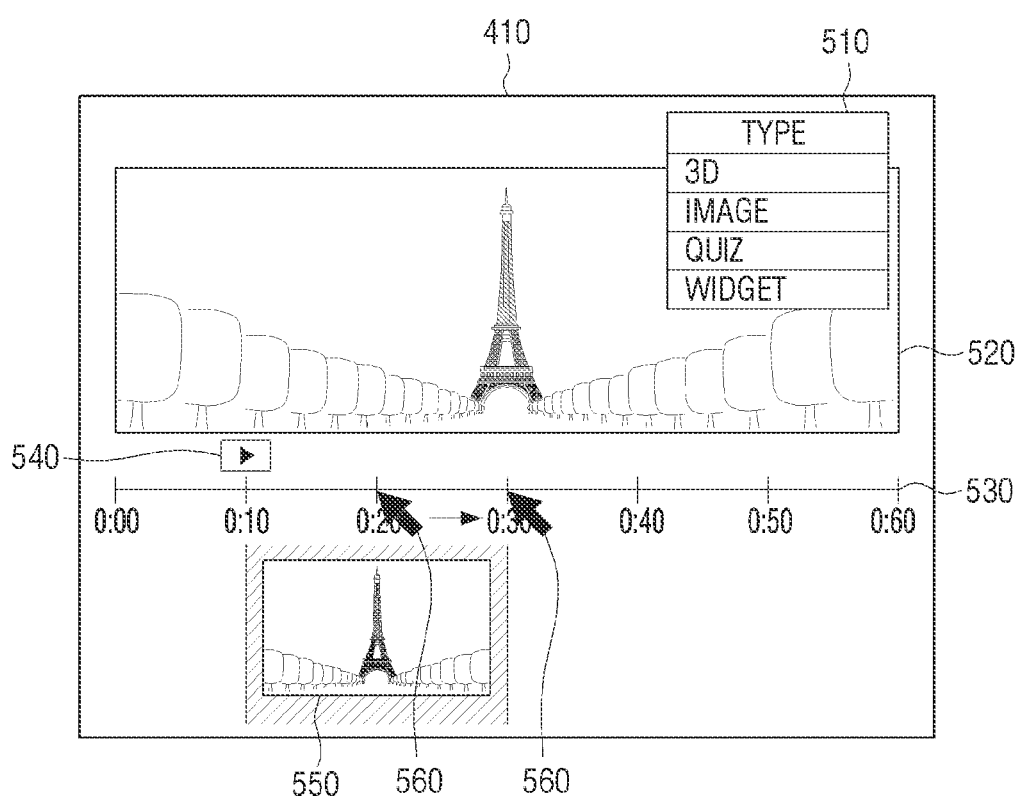
Figure 9:
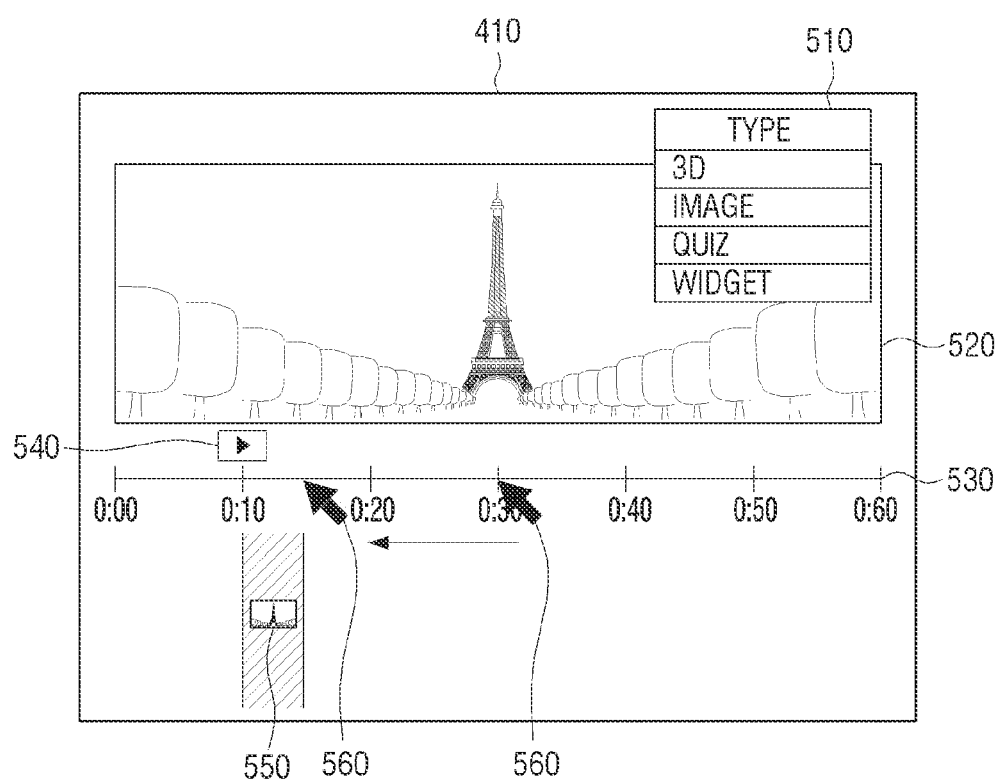

Further, when the play information of the first multimedia object set between 10 and 30 sec as shown in FIG. 8 is reduced to between 10 and 15 sec as shown in FIG. 9 using the pointer 560, the controller 250 may set the play time of the first multimedia object to between 10 and 15 sec after the video play. The interval between 10 and 15 sec, where the first multimedia object is played, may be displayed distinguishably from the rest area, and the thumbnail 550 of the first multimedia object may be displayed in the interval between 10 and 15 sec where the first multimedia object is played.

Figure 11:
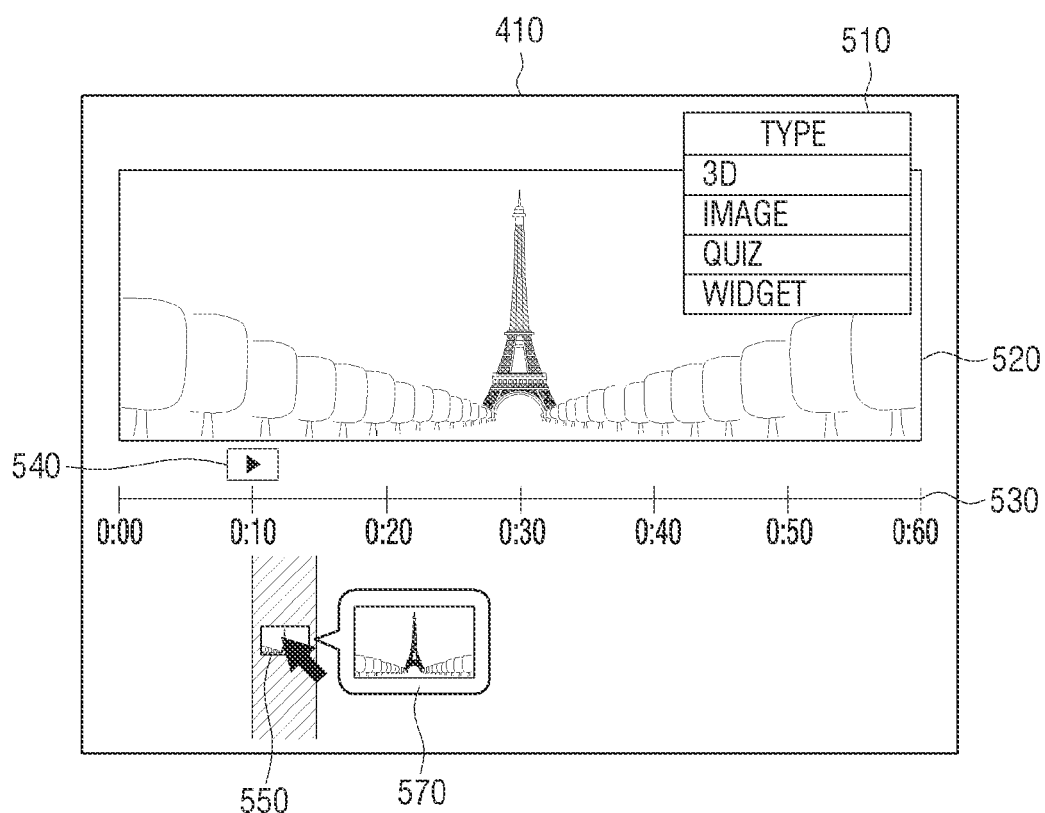

Meanwhile, referring to FIG. 9, when the play time of the first multimedia object is short so that the thumbnail 550 of the first multimedia object is displayed in a small size, a cursor 560 may be moved through the user input 240 to the location of the thumbnail 550 of the first multimedia object, in response to which the controller 250 may, as shown in FIG. 11, display the thumbnail 570 in an increased size on the side of the time of playing the first multimedia object.

Figure 10:
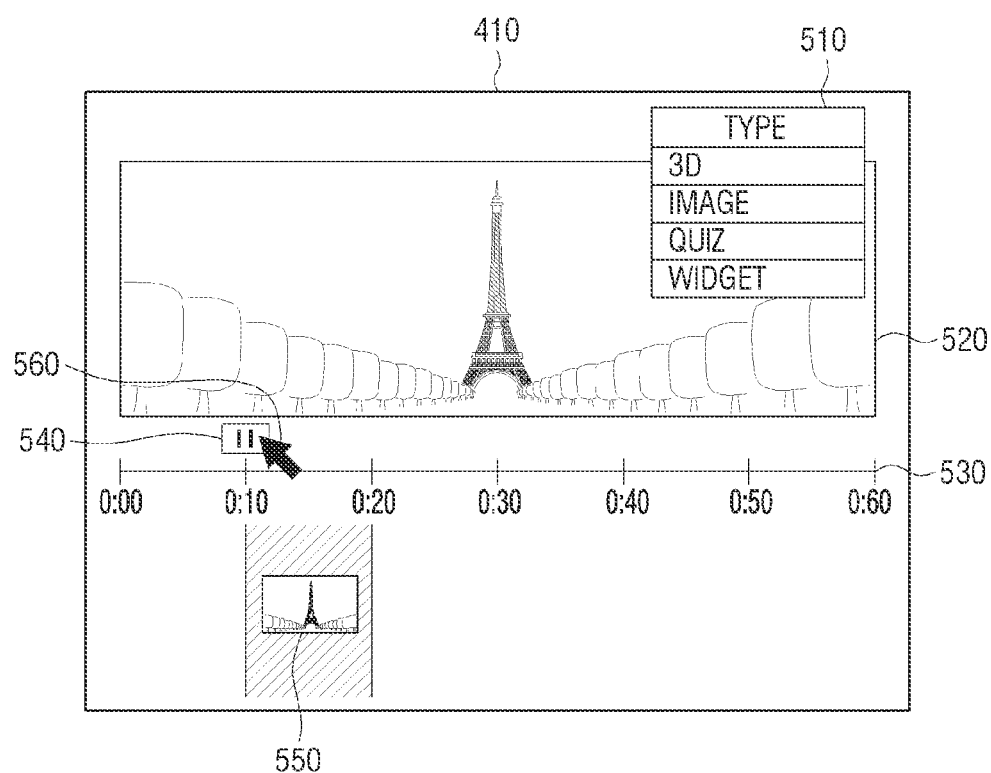

Further, in response to a user command inputted using the play icon 540 of the multimedia object information, the controller 250 may generate information as to whether or not to play the video along with the played multimedia object, in accordance with the user command inputted to the play icon 540. For example, when the play icon 540 shows 'play (≃)' in accordance with the user command, the controller 250 sets so that the video is played along when the multimedia object is played, and as shown in FIG. 10, when the play icon 540 shows 'pause (||)' in accordance with the user command, the controller 250 may set so that the video is paused when the multimedia object is played.

Meanwhile, in response to a preset user command (e.g., a double click) to the multimedia object generating window 410, the controller 250 eliminates the second region from the multimedia object generating window 410, and displays only the preview image 250 of the first region. Accordingly, the user is able to play a multimedia object on a trial basis to confirm the multimedia object he intends to generate.

Meanwhile, the types, size, location or play time of the multimedia object may be set using the multimedia object generating window 410, but not limited thereto. Accordingly, various other functions of the multimedia object can be set. For example, it is possible to set various functions as those listed in Table 2 below via the multimedia object generating window 410.

Meanwhile, although the embodiments generate one multimedia object in synchronization with video via the multimedia object generating window 410, an embodiment is not limited to this specific embodiment only. Accordingly, a plurality of multimedia objects in synchronization with video may be generated. For example, it is possible to incorporate the first multimedia object between 10 and 20 sec, and incorporate the second multimedia object between 40 and 50 sec.

Referring to FIGS. 3 to 10, when the user sets information about multimedia objects using the multimedia object generating window 410, the controller 250 may generate information about the multimedia object in synchronization with video, based on the user setting.

The multimedia object in synchronization with video may be in a JSON or an XML format. The information about the multimedia object in synchronization with the video may particularly be stored within Extensible HyperText Markup Language (XHTML) script that constitutes the e-book content, and stored as a separate file. Further, when the information about the multimedia object in synchronization with video is in a separate JSON format file, it is possible to process the information about the multimedia object with the Java script on the side of viewer. When the information about the multimedia object in synchronization with video is written in an XML format and comprised in XHTML, on the viewer's side, it is possible to process the multimedia object information with the Java script module or native module.

Table 1 below shows a constitution of the electronic publication (epub) 3-based e-book content file.

TABLE 1

| | |
|---|---|
| xxx.XHTML | Stands for content including therein all the components of the page. This involves a synchronization function, in which IDs of the respective components match multimedia objects in synchronization information file. |
| Vsync.js(JSON) | User-generated synchronization information. This includes information about multimedia object in synchronization with video. |
| Vsync_parser.js | This may be provided as a package with xxx.XHTML, Vsync.js(JSON), Vsync_processor.js. Executable on a viewer's side, and parses synchronization information written in the JSON format. |
| Vsync_processor.js | This may be provided as a package with xxx.XHTML, Vsync.js(JSON), Vsync_parser.js. Executed on QBD's side, and processes parsed synchronization information to provide various multimedia styles and effects. |

Table 2 below lists multimedia objects which can be provided by the video sync information.

TABLE 2

| category↵ | feature↵ | description |
|---|---|---|
| ↵ | Font Type↵ | Text font type designation↵ |
| ↵ | | Ex.) style=" font-weight:bold;" (bold text)↵ |
| ↵ | Font Size↵ | Text font size designation↵ |
| ↵ | | Ex.) style=" font-size:10pt;" (10 font size of text) |
| ↵ | Show/Hide↵ | Text show or hide↵ |

TABLE 2-continued

| category | feature | description |
|---|---|---|
| | | Ex.) style=" DISPLAY: inline;" (show) |
| | | style=" DISPLAY: none;" (hide) |
| | Text Color | Text color designation |
| | | Ex.) style=" color:red;" (red color text) |
| text | Background Color | Text backgound color designation (Text highlight) |
| | | Ex.) style=" background:green;" (green color background) |
| | Underline | Text underline designation |
| | | Ex.) style=" text-decoration:underline;" (underline text) |
| | Border Style | Text border line designation |
| | | Ex.) style=" border-width:1pt;border-color:blue;border-style:outset;" |
| | Show/Hide | Image show or hide |
| | | Ex.) style= " DISPLAY: inline;" (show) |
| | | style=" DISPLAY: none; (hide);" |
| image | Resize | Image resize |
| | | Ex.) width=" 200" height="300" |
| | Position Change | Image position moving |
| | | Ex.) style=" position:absolute;top:30%;left:30%;" |
| widget (Interactive image, Image gallery, 3D) | Show/Hide | Widget show or hide |
| | | Ex.) style=" DISPLAY: inline;" (show) |
| | | style=" DISPLAY: none; (hide);" |
| | Position Change | Widget position moving |
| | | Ex.) style=" position:absolute;top:30%;left:30%;" |
| | Play/Stop | Video play or stop |
| | | Ex.) video[video_id].play( ); |
| | | video[video_id].pause( ); |
| video | Volume | Video volume setting |
| | | Ex.) video[video_id].volume = 0.5 (range= 0.0~1.0); |
| | Show/Hide | Video show or hide |
| | | Ex.) style=" DISPLAY: inline;" (show) |
| | | style=" DISPLAY: none; (hide);" |

Further, Table 3 below shows one example of a specification of the information about a multimedia object in synchronization with video. The specification below is extendable to achieve various functions, and can provide multimedia contents in synchronization with the play time of the video.

video_id: id of a target video element
video_play_type: an attribute for video play control ("play" or "stop")
video_style: an attribute for video style change
video_volume: an attribute for video volume value change

TABLE 3

| Root | | | | |
|---|---|---|---|---|
| | | doc_src | | |
| | | | ref_id | |
| | | | target_tag | |
| | | | | video_id |
| | | | | |
| | | | | |
| Vsync_Obj | Vsync_Info | | | video_play_type |
| | (Array) | vsync_element | | video_style |
| | | (Array) | vsync_attrs | video_volume |
| | | | (Array) | display_style |
| | | | | position_style |
| | | | | etc_style |
| | | | | width |
| | | | | height |
| | | | | sync time |
| | | | | Param1 |

The fields in Table 3 are described below:
Vsync_Obj: video sync information object
Vsync_Info: video sync information for each page (xhtml)
doc_src: xhtml document source
vsync_element: video sync information for an element in a xhtml
ref_id: id matched with id of an element in a xhtml
target_tag: tag name of an element in a xhtml
vsync_attrs: video sync attributes
style: a style attribute for element style change
sync_time: sync event time during video play
width: a width attribute
height: a height attribute
param1: an extra attribute1 for function extension In one embodiment, FIG. 12 illustrates synchronization information written in the JSON format as the one shown in Table 3 according to an embodiment of the present disclosure. FIG. 12 illustrates synchronization information about a text type multimedia object.

As explained above, by providing information about multimedia media in synchronization with video included in e-book content along with the e-book content, on the viewer's side, it is possible to play at least one multimedia object in synchronization with the video, as the video included in the e-book content is played upon execution of the e-book content. As a result, the user can be provided with interactive multimedia content.

Further, the user is able to generate a multimedia object in synchronization with video more intuitively, by using the multimedia object generating window 410.

Figure 13:
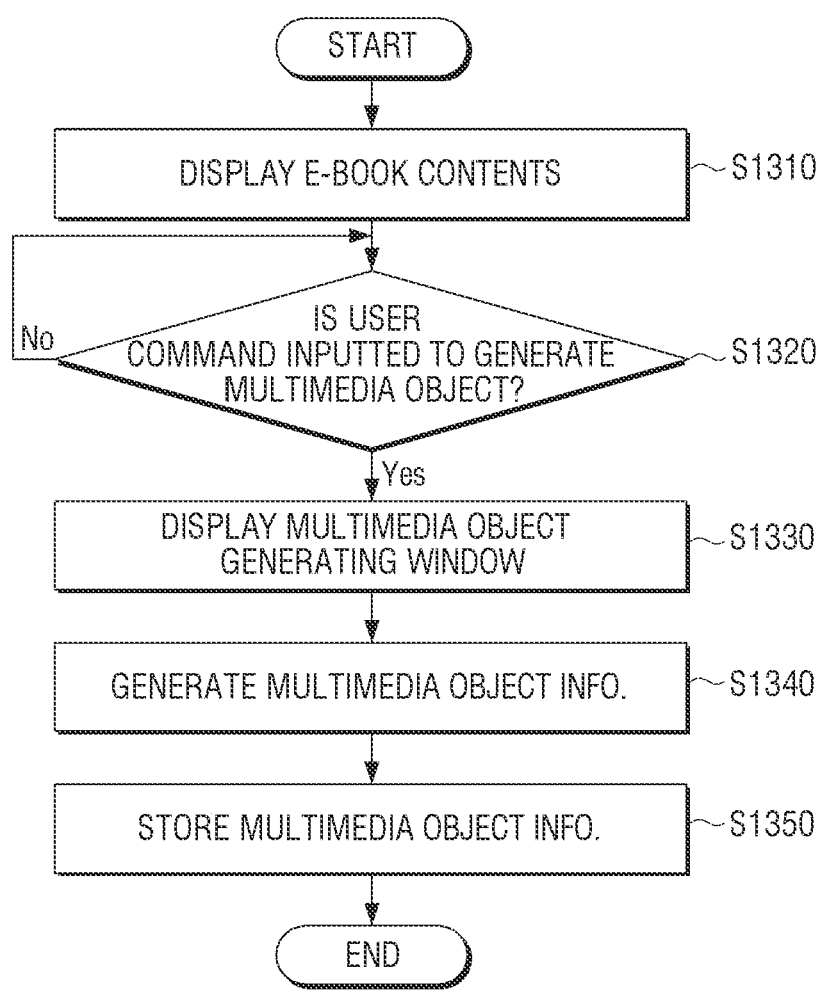
FIG. 13 is a flowchart provided to explain a method for authoring multimedia content according to an embodiment of the present disclosure.

The method for generating multimedia content of an electronic apparatus will be explained below with reference to FIG. 13.

First, at operation S1310, the electronic apparatus 100 displays e-book content. The electronic apparatus 100 may display a page screen of e-book content incorporating therein text and video. The page screen according to one embodiment may be provided for the purpose of editing.

At operation S1320, the electronic apparatus 100 determines as to whether the user command for multimedia object generation is inputted or not. The user command directing to generate a multimedia object may be inputted by selecting a menu to generate multimedia object from among the menu provided on one side of the page screen.

At operation S1320, when a user command to generate multimedia object is inputted, at operation S1330, the electronic apparatus 100 displays the multimedia object generating window 410. At this time, the multimedia object generating window 410 may be a UI movable and size-adjustable within the page screen, and may comprise a first region to display a multimedia object as set by the user, and a second region to generate synchronization information between the multimedia object and the video. The multimedia object generating window 410 is explained in detail above with reference to FIG. 5.

At operation S1340, the electronic apparatus 100 generates a multimedia object information in accordance with the user command as inputted, using the multimedia object generating window. To be specific, the electronic apparatus 100 may generate multimedia object information in a manner explained above with reference to FIGS. 6 to 11. The multimedia object information may comprise at least one of synchronization information, synchronization parser information, and synchronization processor information. The synchronization information may be written in JSON or XML format.

At operation S1350, the electronic apparatus 100 stores multimedia object information. The electronic apparatus 100 may store the multimedia object information as a separate file, and within the e-book content.

Accordingly, with the method explained above, the user is able to easily incorporate a multimedia object into e-book content, using the multimedia object generating window.

Meanwhile, although the multimedia object is incorporated into e-book content in the embodiments explained above, other content using the JSON or XML format (e.g., web page content) is also applicable.

Meanwhile, the method for generating multimedia of an electronic apparatus according to various embodiments can be implemented as a program and provided to a display apparatus.

To be specific, a non-transitory computer readable medium may be provided, storing therein a program comprising steps of displaying a page screen of e-book content comprising text and video, displaying a multimedia object generating window within the page screen in response to a user command directing to generate the multimedia object generating window, generating information about the multimedia object in synchronization with the video, using the multimedia object generating window, and storing the information about a multimedia object in synchronization with the video.

The non-transitory computer readable recording medium indicates a medium which stores data semi-permanently and can be read by devices, and not a medium storing data temporarily such as register, cache, or memory. Specifically, the above various applications or programs may be stored and provided in non-transitory computer readable recording medium such as Compact Disc (CD), Digital Versatile Disc (DVD), hard disk, Blu-ray disk, Universal Serial Bus (USB), memory card, or ROM.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for authoring multimedia contents of an electronic apparatus, the method comprising:
    displaying a page screen of electronic book content comprising text and video;
    receiving a user command to generate a multimedia object in synchronization with the video;
    displaying a multimedia object generating window which is movable and size- adjustable within the page screen; and
    generating the multimedia object to play in synchronization with the video in response to the user command through the multimedia object generating window and storing the multimedia object in synchronization with the video,
    wherein the multimedia object generating window comprises a first region to display a multimedia object as set by a user, and a second region to generate synchronization information between the multimedia object and the video, and
    wherein the second region comprises a time bar generated based on play time information of the video, the time bar being configured to show the progress of the placing of the multimedia object.

2. The method of claim 1, wherein the second region further comprises:
    a play icon configured to set as to whether or not to play the video when the multimedia object is displayed.

3. The method of claim 2, wherein the second region further comprises a region to indicate a thumbnail of the multimedia object as set by the user.

4. The method of claim 1, wherein the generating and storing comprises:
    moving the multimedia object generating window within the page screen in response to a user's drag input; and
    generating location information to display the multimedia object based on a location after movement in the page screen.

5. The method of claim 1, wherein the generating and storing comprises:
    adjusting a size of the first region in response to a user input; and
    generating size information to display the multimedia object based on the adjusted size.

6. The method of claim 1, wherein the multimedia object comprises at least one of a text, an image, a 3 Dimensional (3D) image, a widget, a quiz, and a video.

7. The method of claim 1, wherein the multimedia object in synchronization with the video comprises at least one of synchronization information, synchronization parser information, and synchronization processor information.

8. The method of claim 7, wherein the synchronization information is written in a JavaScript Object Notation (JSON) or Extensible Markup Language (XML) format.

9. An electronic apparatus for executing electronic book content, the electronic apparatus comprising:
- a display configured to display a page screen of the electronic book content comprising text and video;
- a user input configured to receive a user command; and
- a controller configured to control the display to display a multimedia object generating window which is movable and size-adjustable within the page screen, and to generate the multimedia object to play in synchronization with the video in response to the user command through the multimedia object generating window, in response to a user command inputted through the user input directing to generate the multimedia object in synchronization with the video,
- wherein the multimedia object generating window comprises a first region to display a multimedia object as set by a user, and a second region to generate synchronization information between the multimedia object and the video, and
- wherein the second region comprises a time bar generated based on play time information of the video, the time bar being configured to show the progress of the placing of the multimedia object.

10. The electronic apparatus of claim 9, wherein the second region further comprises:
- a play icon configured to set as to whether or not to play the video when the multimedia object is displayed.

11. The electronic apparatus of claim 10, wherein the second region further comprises a region to indicate a thumbnail of the multimedia object as set by the user.

12. The electronic apparatus of claim 9, wherein the controller controls the display to move the multimedia object generating window within the page screen in response to a user's drag input, and to generate location information to display the multimedia object based on a location after movement in the page screen, in response to a user's drag input inputted to the user input directing to move the multimedia object generating window.

13. The electronic apparatus of claim 9, wherein the controller controls the display to adjust a size of the first region in response to a user input and display, and to generate size information to display the multimedia object based on the adjusted size, in response to a user command inputted to the user input directing to adjust the size of the first region.

14. The electronic apparatus of claim 9, wherein the multimedia object comprises at least one of a text, an image, a 3 Dimensional (3D) image, a widget, a quiz, and a video.

15. The electronic apparatus of claim 9, wherein the multimedia object in synchronization with the video comprises at least one of synchronization information, synchronization parser information, and synchronization processor information.

16. The electronic apparatus of claim 15, wherein the synchronization information is written in a JavaScript Object Notation (JSON) or Extensible Markup Language (XML) format.

17. A non-transitory computer-readable recording medium recording therein a program to execute a method for authoring multimedia content, the method for authoring multimedia content comprising:
- displaying a page screen of electronic book content comprising text and video;
- receiving a user command to generate a multimedia object in synchronization with the video;
- displaying a multimedia object generating window which is movable and size-adjustable within the page screen; and
- generating a multimedia object to play in synchronization with the video in response to the user command through the multimedia object generating window, and
- storing the multimedia object in synchronization with the video,
- wherein the multimedia object generating window comprises a first region to display a multimedia object as set by a user, and a second region to generate synchronization information between the multimedia object and the video, and
- wherein the second region comprises a time bar generated based on play time information of the video, the time bar being configured to show the progress of the playing of the multimedia object.

* * * * *